Oct. 5, 1943.   R. H. B. JONES   2,331,074
PROCESS OF TREATING IRON ORE
Filed June 17, 1942
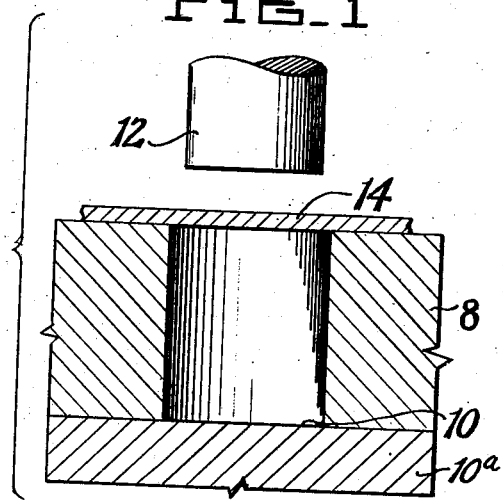
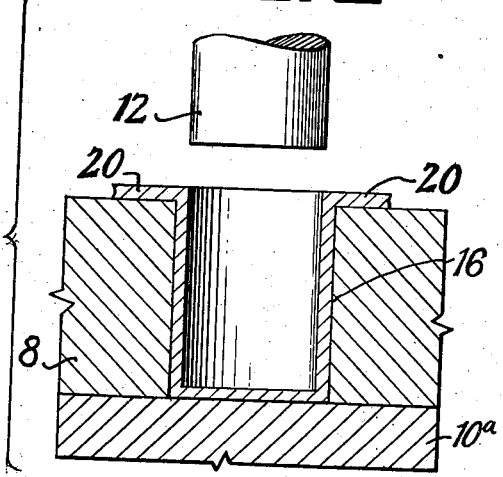
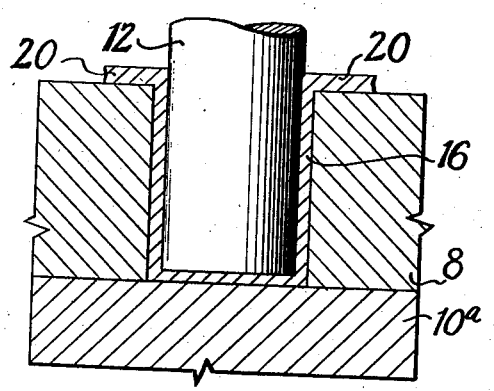
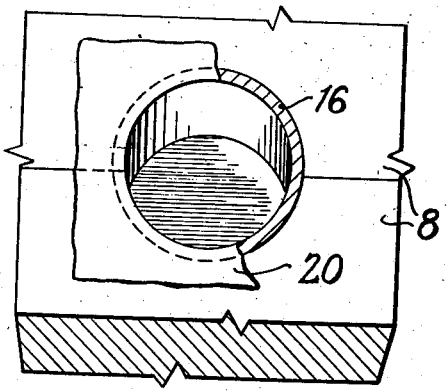
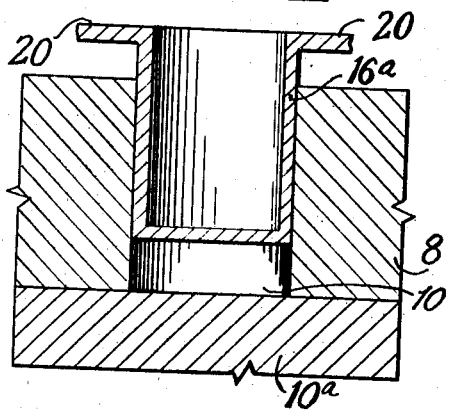
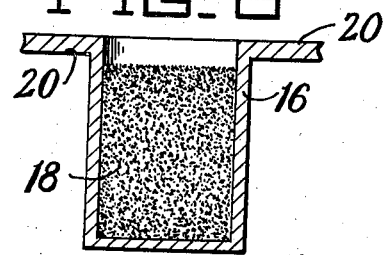
INVENTOR
RUSSELL H. B. JONES,
by: John E. Jackson
his Attorney.

Patented Oct. 5, 1943

2,331,074

UNITED STATES PATENT OFFICE 2,331,074

PROCESS OF TREATING IRON ORE

Russell H. B. Jones, Duluth, Minn.

Application June 17, 1942, Serial No. 447,415

7 Claims. (Cl. 75—56)

In accordance with the present invention, there are provided improvements in the preparation of a hard, dense product from porous, high moisture-containing iron ore which product is suitable for adding to the melt in an open hearth furnace.

In the Mesabi range of Minnesota, for example, there are found the largest open pit mining operations of iron ore in the world. These ores are mainly soft, porous, blue, red, yellow and brown hematites, with minor amounts of magnetite and some of the hydrated oxides of iron.

In the use of iron ore in an open hearth melt, it is a requisite that the ore be in a hard and dense condition, and of low moisture content. However, certain ores, such as, for example, Mesabi range ore in its natural state are not satisfactory materials for the purpose of open hearth charging, on account of its being soft, porous, and of high moisture content, there being approximately 10% of moisture. This moisture content is a source of danger when charged into molten metal, and, furthermore, it makes the Mesabi ore bulky and light in weight. Consequently, this ore does not possess requisite physical properties for enabling its use as a component in the charge of an open hearth furnace, where it is customary to use iron ore to deliver oxygen where it is needed in the furnace charge for oxidizing impurities present therein.

However, in view of the ease with which the Mesabi ores are obtained, it is very desirable to utilize such ore in open hearth operations.

The present invention has for its principal object the provision of a process which enables the light, porous and bulky iron ores to be converted into dense and compact masses which are wholly suitable for use in open hearth furnace operations.

Further objects and advantages of the process of the present invention will become apparent as the description proceeds, and the features of novelty will be pointed out in particularity in the appended claims.

The present process includes the steps of dehydration of the ore briquetting, and incipient sintering. These steps will be discussed in greater detail hereinafter.

In the operation of the improved process, the soft ore, of high iron content, may be crushed or ground, if necessary, to a suitable fineness so that it may be dehydrated readily. Because of the natural fineness of the Mesabi ore, however, a considerable quantity of the ore already is fine enough in the natural state, so that no crushing or grinding thereof is necessary, it being sufficient simply to screen the ore. Additionally, there are certain concentrates that are of sufficient fineness so as not to require crushing.

After crushing, or screening, the ore is dehydrated, if necessary to eliminate both hygroscopic water and water of crystallization. This dehydration may be carried out in either a sintering machine, a furnace, or rotary kiln under oxidizing conditions, in order to utilize the oxygen in the ore for this purpose. The temperature of the dehydration must be controlled to prevent melting of the ore, or the formation of iron silicates. The quantity of heat required to dehydrate an iron ore containing 10% moisture is approximately 500 B. t. u.'s per pound of ore, or 1,120,000 B. t. u.'s per long ton of raw ore.

The next step of the process is the step of briquetting.

In accordance with this process, the dehydrated ore from the dehydration stage is passed directly into a hopper from which it is fed, in measured quantities, into a mechanical cylindrical pressure chamber.

The briquetting was performed under pressure only, no binding agent being employed to form the briquettes, owing to the unpredictable behavior thereof when made a portion of a furnace charge. In the present case, the elimination of the binding material eliminates likewise the possible presence of deleterious substances which might be formed from the binding material. The ores, dried and screened through 100 mesh are formed into briquettes under a pressure of 20 tons per square inch, although, in some instances, pressures of about 20,000 pounds per square inch on heated ore produce a non-porous and compact ore cylinder. In the even that the above-mentioned ore cylinders, which are briquetted without any binder, do not have sufficient crushing strength to stand rough handling, they may require a superficial sintering to add strength to the outer layer or "crust" of the cylinder. This is accomplished by passing the compacted cylinders of ore through a small soaking pit or furnace, sintering machine or similar equipment, for "case hardening."

Ores being briquetted for the purpose of this invention are processed as follows:

Dried Mesabi ore from the Minnewas mine was screened to 100 mesh and briquetted under 20 tons pressure per square inch.

Dried ore from the Spruce mine was sized to 100 mesh and briquetted under 20 tons pressure per square inch.

The ore in natural condition from the Spruce mine was sized to 40 mesh and briquetted under 20 tons pressure per square inch.

Dried ore from the Spruce mine was crushed to ¼" mesh and briquetted under 25 tons pressure per square inch.

Natural Spruce ore crushed to ¼" mesh was briquetted under 20 tons pressure per square inch.

Ore taken from the Spruce mine was dried at 212° F., assayed approximately iron 65.62%, phosphorus 0.044%, silica 2.54%, manganese 0.46%, moisture 2.40%, alumina 0.67%, and natural iron 64.04%.

A sample of ore from the Minnewas pit, which was sampled from an ore dump of cast material in the bottom of the pit assayed approximately iron 61.41%, phosphorus 0.061%, silica 3.20%, manganese 0.32% and alumina 1.63%.

With these two ores as test material, it was determined first at what pressure a briquette will form. At 5 tons per square inch a coherent mass was produced, which, however, crumbled on handling. At 10 tons a more compact coherent mass forms, which still could be crushed on handling. At 15 tons a compact, heavy cake formed which stood the handling and impact of a 2 foot drop upon a concrete floor, but at 3 feet the cylindrical cake cracked into several pieces when so dropped. However, at 20 tons, a still harder and more compact, heavy cake was formed which will not break until dropped from a height of 4 feet. These tests showed the production of a substantially non-porous product.

The best cakes for this purpose are obtained from dehydrated ore, high in alumina content, which pass through a 40 to 100 mesh screen. As cakes could be formed at 20 tons pressure per square inch which were satisfactory, and which may be produced from all types of ore, this pressure of 20 tons was used on most of the tests made, and which is recommended as being preferred for use, but the amount of briquetting pressure to be employed greater or less than 20 tons depends importantly upon the character of the ore, and the hardness of its outer surfaces.

In order to assure the obtaining of satisfactory briquettes, however, the soft dried material may be compressed into containers or receptacles which then are ready for furnace charging. The containers thus employed preferably are made from steel scrap, or similar material which preferably is compatible with the charge in the furnace to which the briquetted ore is to be added, the ore and the container being added together. But, of course, the compacted body of ore may be removed from the container and added alone.

A method of forming the containers is illustrated in the accompanying drawing wherein:

Figure 1 represents a fragmentary sectional elevation of the briquetting mold and the plunger for effecting the compression, with a blank for a container positioned over the mold and adapted to be placed into the mold to form a container;

Fig. 2 is a view similar to Fig. 1 but showing the blank of Fig. 1 pressed into the mold to form the receptacle, the plunger being shown as being at the end of its stroke;

Fig. 3 is a view similar to Fig. 2, but showing the plunger withdrawn and the receptacle or container remaining in the mold;

Fig. 4 is a fragmentary perspective view, partially in section, showing the interior of the container or receptacle in position in the mold;

Fig. 5 shows the insertion of a pre-formed container or receptacle in the mold, the view being a sectional elevation; and, Fig. 6 is a sectional elevation showing a container or receptacle having a compacted briquette therein.

Referring more particularly to the drawing, reference number 8 represents a mold assembly which extends through the mold 8 to the bottom piece 10a having a cavity 10 therein, which cavity receives the ore to be compressed into the briquettes, the compression being effected by a plunger 12, which is actuated suitably as by hydraulic pressure to give the requisite high pressures referred to above. In Fig. 1 a blank for forming a container is indicated at 14, underlying the mold cavity 10, this blank being made from a suitable sheet of scrap steel, or the like.

As the plunger 12 engages the blank 14 on the inward movement of the plunger, it presses the blank 14 into the form of a hollow receptacle 16, which receptacle remains in place in the mold cavity when the plunger is withdrawn. The container 16 then is ready to receive the iron ore, or other material indicated at 18, which is illustrated as being compressed in the container 16 under action of the plunger 12.

Instead of the container 16 being made in the above described manner, a preformed receptacle 16a may be placed into the cavity 10 of the mold 8, filled with the material to be compressed, and then subjected to the action of the plunger 12 to form a briquette. It will be understood that both the briquetting material and its container may be added to the furnace charge, or the briquetted ore may be removed from the container and added alone to the charge. But the presence of the container is preferred, as it gives assurance of requisite strength of the briquette.

It is desirable to provide the containers 16 and 16a with an annular flange 20 to facilitate removal of the container and its compressed ore from the mold.

The bottom piece 10a is removable from the mold 10 in any suitable manner. Also, the mold 8 may be made of two parts, as shown in Fig. 4, suitably joined together and separable. These parts together with the bottom piece 10a which also is removable readily enable a convenient dismantling of the mold assembly to effect release of the container 16 with its compressed charge.

By operating in this manner, not only is there provided a container for the material to be compressed which reinforces and strengthens, but the use of the container protects the walls of the mold against destructive attrition by the ore and plunger, and thereby prolongs the life of the mold.

While the process of the invention has been described with particular reference to soft, porous, iron ores, other materials rich in iron oxide, such as flue dust, scale and concentrates, may be treated likewise to compact and harden them, thereby rendering them suitable for furnace charging without introducing any extraneous materials therein.

It will be understood that pressure only produces the cohesive compacting that converts the finely divided material into dense, hard masses, no binder being added to enhance the cohesion.

The present application is a continuation-in-part of the application of Russell H. B. Jones, Serial No. 424,195, filed December 23, 1941, for processing and treating iron ores.

I claim:

1. The process of treating a finely divided iron ore for improving its suitability for use in a furnace charge, which comprises heating the said ore in finely divided condition and in its natural state sufficiently to substantially completely dehydrate the ore, subjecting the resulting dehydrated ore in the absence of extraneous materials to briquetting pressures in containers retained in a mold, applying pressure sufficiently high to compress the ore in the containers into a dense and hard condition, the containers being adapted to reinforce and strengthen the resulting briquetted material, and charging the resulting briquetted ore and containers into the furnace charge.

2. The process of treating a finely divided iron ore for improving its suitability for use in a furnace charge, which comprises heating the said ore sufficiently high to dehydrate the ore substantially completely but below the fusion temperature of the ore, placing the resulting dehydrated ore into a suitable container retained in a mold, and subjecting the resulting dehydrated ore in the container while hot to pressure to cause the ore to form of itself a hard, substantially non-porous mass, the said pressure being of the order of twenty tons per square inch.

3. The process of conditioning iron oxide material to render it suitable for introducing into an open hearth furnace melt, which comprises changing the material in finely divided and dehydrated condition from the said finely divided condition into dense and hard briquettes by placing the said material in a suitable receptacle of a composition compatible with that of the furnace charge and contained in a suitable mold, compressing the said material in the receptacle into the dense and hard mass under pressures sufficient to convert the material into a substantially non-porous agglomerate, removing the material together with the receptacle from the mold, and charging the material and receptacle into the furnace.

4. The process of conditioning finely divided iron oxide ore to render it suitable for introducing into an open hearth furnace melt, which comprises changing the ore in finely divided and dehydrated condition from the said finely divided condition into dense and hard briquettes, by placing the said ore, in the absence of extraneous materials into a container held in a mold, compressing the said ore in the container into the dense and hard mass under pressures sufficient to convert the ore into a substantially non-porous highly fracture-resistant agglomerate, and removing the resulting briquettes from the mold.

5. The process of conditioning iron oxide material to render it suitable for introducing into an open hearth furnace melt, which comprises placing a suitable ferrous metal blank over a cavity of a mold, pressing the said blank into a container retained in the mold, placing the said material in finely divided and dehydrated condition into the said container in the mold, compressing the said material into a dense and hard mass under pressures sufficient to convert the said material into a substantially non-porous agglomerate, and removing the resulting briquetted material and container from the mold.

6. The process of conditioning and utilizing finely divided, naturally occurring iron oxide ores to render the ores suitable for introducing into the open hearth furnace melt, which comprises placing a sheet steel blank over a cavity of a mold, pressing the said blank into the mold cavity into engagement with the walls and bottom of the cavity to form a liner for the cavity and container for the ore, placing the ore in its natural state in the container retained in the mold, compressing the ore into the container to form a dense, hard mass under pressures sufficient to convert the ore into a substantially non-porous and highly fracture-resistant body, removing the resulting body and container from the mold, and adding the said body and container to an open hearth furnace melt.

7. The process of conditioning and utilizing finely divided, naturally occurring iron oxide ores to render the ores suitable for introducing into the open hearth furnace melt, which comprises placing a sheet steel blank over a cavity of a mold, pressing the said blank into the mold cavity into engagement with the walls and bottom of the cavity to form a protective liner for the mold and container for the ore, placing the ore in finely divided and dehydrated condition in the container in the mold, the ore being free from extraneous materials, compressing the ore into the container to form a dense, hard mass under pressures sufficient to convert the ore into a substantially non-porous and highly fracture-resistant body, removing the container with the resulting ore body therein from the mold, and adding the container and body to an open hearth furnace melt.

RUSSELL H. B. JONES.